US008738308B2

(12) United States Patent
Kitano

(10) Patent No.: US 8,738,308 B2
(45) Date of Patent: May 27, 2014

(54) METHOD, APPARATUS, AND PROGRAM FOR DETECTING DECREASE IN TIRE AIR PRESSURE

(75) Inventor: Masashi Kitano, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 376 days.

(21) Appl. No.: 13/213,178

(22) Filed: Aug. 19, 2011

(65) Prior Publication Data

US 2012/0197551 A1 Aug. 2, 2012

(30) Foreign Application Priority Data

Feb. 2, 2011 (JP) ................................ 2011-020525

(51) Int. Cl.
*G06F 19/00* (2011.01)
(52) U.S. Cl.
USPC ........ 702/50; 702/148; 340/444; 340/426.33; 340/442; 340/445; 73/146; 73/146.4; 73/146.5; 701/70
(58) Field of Classification Search
USPC ............... 702/50, 148; 340/444, 426.33, 429, 340/440, 441, 442, 443, 445, 447; 73/146, 73/146.2, 146.3, 146.4, 146.5; 701/70, 78, 701/79, 169
See application file for complete search history.

(56) References Cited

U.S. PATENT DOCUMENTS

| 4,777,611 | A | * | 10/1988 | Tashiro et al. | ................. 702/148 |
| 4,876,528 | A |   | 10/1989 | Walker et al. | |
| 7,248,953 | B2 | * | 7/2007 | Ogawa | .......................... 701/30.2 |
| 7,868,749 | B2 | * | 1/2011 | Miyamoto et al. | ............ 340/444 |
| 8,359,148 | B2 | * | 1/2013 | Inoue et al. | ...................... 701/78 |
| 8,466,782 | B2 | * | 6/2013 | Kusunoki et al. | ............. 340/442 |
| 2005/0235744 | A1 | * | 10/2005 | Ogawa | ............................ 73/146 |
| 2009/0261961 | A1 | * | 10/2009 | Miyamoto | .................... 340/444 |

FOREIGN PATENT DOCUMENTS

| JP | 63-305011 A | 12/1988 |
| JP | 2005-53263 A | 3/2005 |
| JP | 2009-255711 A | 11/2009 |

* cited by examiner

*Primary Examiner* — Carol S Tsai
(74) *Attorney, Agent, or Firm* — Birch, Stewart, Kolasch & Birch, LLP

(57) ABSTRACT

A method of detecting a decrease in tire air pressure includes calculating tire rotation information obtained from the wheel tires; computing a first determination value showing a difference between the sums of the wheel rotation information of pairs of wheel tires on two diagonal lines and a second determination value showing a difference between the sum of the wheel rotation information of right wheel tires and the sum of the wheel rotation information of left wheel tires; assuming the computed first and second determination values as points on orthogonal coordinates; determining position of tire(s) having a decreased pressure based on the argument of the points on the polar coordinates; and comparing the moving radii of the points on the polar coordinates with a predetermined threshold value to thereby determine a decrease in tire air pressure.

12 Claims, 8 Drawing Sheets

1: Wheel speed detection means
2: Control unit
3: Display unit
4: Initialization button
5: Alarm unit

METHOD, APPARATUS, AND PROGRAM FOR DETECTING DECREASE IN TIRE AIR PRESSURE

TECHNICAL FIELD

The present invention relates to a method, an apparatus, and a program for detecting a decrease in tire air pressure. In particular, the present invention relates to a method, an apparatus, and a program for detecting a decrease in tire air pressure by which the position of a tire having a decreased pressure can be specified.

BACKGROUND ART

Conventionally, an apparatus for detecting a decrease in tire air pressure uses a principle according to which a tire having a decreased pressure has a smaller outer diameter (tire dynamic loaded radius) than those of tires having a normal air pressure and thus has an increased angular velocity (wheel speed) when compared with other normal tires. For example, in the case of a method of detecting a decrease in air pressure based on the relative difference in the tire wheel speed, the following determination value DEL is used.

$$DEL=\{(V1+V4)/2-(V2+V3)/2\}/\{(V1+V2+V3+V4)/4\} \times 100(\%)$$

When the absolute value of this DEL exceeds an alarm threshold value, a decreased pressure alarm is issued (see Patent Literature 1 for example). In the formula, V1 to V4 denote the wheel speeds of a left-front wheel tire, a right-front wheel tire, a left-rear wheel tire, and a right-rear wheel tire, respectively.

However, although the above determination value DEL can tell that any of the tires (one or two or more tires) has/have a decreased pressure, the above determination value DEL cannot tell which of the tires has a decreased pressure. A continued running with a tire having a decreased pressure equal to or higher than a predetermined amount causes a disadvantage that the fuel cost is deteriorated due to an increased tire rolling resistance to thereby consequently cause a burst. Thus, when such a decreased pressure occurs, a driver must adjust the tire air pressure in a nearby service station for example.

However, the failure to specify the position of a tire having a decreased pressure may cause a risk of a long time to adjust the air pressure.

To solve this, various methods have been suggested by which a tire having a decreased air pressure can be specified (see Patent Literatures 2 to 3 for example).

According to the methods disclosed in Patent Literatures 2 and 3, three determination values DEL1, DEL2, and DEL3 are used so that a tire having a decreased pressure can be specified based on the relation in the magnitude between the respective determination values and a predetermined threshold value. The determination value DEL1 is obtained by dividing a difference between the sums of the wheel rotation information of pairs of wheel tires on two diagonal lines by a predetermined average wheel speed. The determination value DEL2 is obtained by dividing a difference between the sum of the wheel rotation information of the front wheel tires and the sum of the wheel rotation information of the rear wheel tires by the predetermined average wheel speed. The determination value DEL3 is obtained by dividing the difference between the sum of the wheel rotation information of the right wheel tires and the sum of the wheel rotation information of the left wheel tires by the predetermined average wheel speed.

CITATION LIST

Patent Literature

{PTL1} Japanese Unexamined Patent Publication No. 1988-305011
{PTL2} Japanese Unexamined Patent Publication No. 2005-53263
{PTL3} Japanese Unexamined Patent Publication No. 2009-255711

SUMMARY OF INVENTION

Technical Problem

However, in the case of the methods of detecting a decrease in tire air pressure according to Patent Literatures 2 to 3, these methods can specify a tire having a decreased pressure when one tire has a decreased pressure among four tires but cannot specify tires having a decreased pressure when two or more tires have a decreased pressure among the four tires. Thus, there has been desired a method that can specify, even when not only one wheel tire but also two or more tires have a decreased pressure, the positions of the tires having a decreased pressure.

The present invention has been made in view of the situation as described above. It is an object of the present invention to provide a method, an apparatus, and a program for detecting a decrease in tire air pressure that can specify, even when not only one wheel tire but also two or more tires have a decreased pressure, the positions of the tires having a decreased pressure.

Solution to Problem (1) In accordance with the present invention, there is provided a method of detecting a decrease in tire air pressure (hereinafter also may be simply referred to as "detection method") for detecting a decrease in tire air pressure based on wheel rotation information obtained from tires attached to a 4-wheel vehicle, including:

a step of calculating tire rotation information obtained from the respective wheel tires;

a step of computing a first determination value showing a difference between the sums of the wheel rotation information of pairs of wheel tires on two diagonal lines and a second determination value showing a difference between the sum of the wheel rotation information of right wheel tires and the sum of the wheel rotation information of left wheel tires;

a step of assuming the computed first and second determination values as points on orthogonal coordinates for which any one of the first determination value and the second determination value is an X axis and the other is a Y axis and converting the points to polar coordinates;

a step of determining position of tire(s) having a decreased pressure based on the argument of the points on the polar coordinates; and a step of comparing the moving radii of the points on the polar coordinates with a predetermined threshold value to thereby determine a decrease in tire air pressure.

In the detection method of the present invention as well as an apparatus and a program for detecting a decrease in tire air pressure (which will be described later), the first determination value and the second determination value are computed based on wheel rotation information. Then, the first determination value and the second determination value are assumed as points on orthogonal coordinates for which any one of the first determination value and the second determination value is an X axis and the other is a Y axis and the points are converted to polar coordinates. The present inventor has found that, when assuming that the first determination value and the second determination value are points on the polar coordinate system (r, θ), the argument θ thereof can be used to specify tire(s) having a decreased pressure. The specifying as described above includes not only the specifying of one wheel having a decreased pressure but also the specifying of two wheels except for two front wheels and two rear wheels having a decreased pressure. Specifically, the argument θ can be used to specify two diagonal wheels having a decreased pressure, two left wheels having a decreased pressure, and two right wheels having a decreased pressure. By expanding the range within which a decreased pressure can be specified, the labor and time required to adjust the air pressure can be minimized. Furthermore, a decrease in tire air pressure can be determined by comparing the moving radius $\underline{r}$ with a predetermined threshold value.

(2) In the detection method of (1), it is preferred that the predetermined threshold value is different depending on the argument of the point and the threshold value is changed depending on the position of the tire having a decreased pressure. In this case, the threshold value changed depending on the position of the tire having a decreased pressure can reduce the dispersion of the decreased pressure level for issuing the decreased pressure alarm and also can reduce the risk of a false alarm. Specifically, regardless of the position of the tire having a decreased pressure, the decreased pressure alarm can be issued when the same level of the decreased pressure (e.g., 20%-decreased pressure) is reached.

(3) In the detection method of (1) or (2), it is preferred that, when the moving radius is larger than the predetermined threshold value for a predetermined time, a decrease in tire air pressure is determined and the predetermined time is different depending on the position(s) of the tire(s) having a decreased pressure. In this case, by changing the determination time for issuing the decreased pressure alarm or not depending on the position(s) of the tire(s) having a decreased pressure, the risk of a false alarm can be reduced.

(4) In accordance with the present invention, there is also provided an apparatus for detecting a decrease in tire air pressure (hereinafter also may be simply referred to as "detection apparatus") for detecting a decrease in tire air pressure based on wheel rotation information obtained from tires attached to a 4-wheel vehicle, comprising:

a rotation information calculation means for calculating wheel rotation information obtained from the respective wheel tires;

a determination value computation means for computing a first determination value showing a difference between the sums of the wheel rotation information of pairs of wheel tires on two diagonal lines and a second determination value showing a difference between the sum of the wheel rotation information of right wheel tires and the sum of the wheel rotation information of left wheel tires;

a conversion means for assuming the computed first and second determination values as points on orthogonal coordinates for which any one of the first determination value and the second determination value is an X axis and the other is a Y axis and converting the points to polar coordinates;

a position determination means for determining position of tire(s) having a decreased pressure based on the argument of the points on the polar coordinates; and a decreased pressure determination means for comparing the moving radii of the points on the polar coordinates with a predetermined threshold value to thereby determine a decrease in tire air pressure.

(5) In the detection apparatus of (4), it is preferred that the predetermined threshold value is different depending on the argument of the points and the threshold value is changed depending on the position of the tire having a decreased pressure. In this case, the threshold value changed depending on the position of the tire having a decreased pressure can reduce the dispersion of the decreased pressure level for issuing the decreased pressure alarm and also can reduce the risk of a false alarm. Specifically, regardless of the position of the tire having a decreased pressure, the decreased pressure alarm can be issued when the same level of the decreased pressure (e.g., 20%-decreased pressure) is reached.

(6) In the detection apparatus of (4) or (5), it is preferred that the decreased pressure determination means determines a decrease in tire air pressure when the moving radius is larger than the predetermined threshold value for a predetermined time and the predetermined time is different depending on the position(s) of the tire(s) having a decreased pressure. In this case, by changing the determination time for issuing the decreased pressure alarm or not depending on the position(s) of the tire(s) having a decreased pressure, the risk of a false alarm can be reduced.

(7) In accordance with the present invention, there is further provided a program for detecting a decrease in tire air pressure (hereinafter also may be simply referred to as "program") that causes, in order to detect a decrease in tire air pressure based on wheel rotation information obtained from tires attached to a 4-wheel vehicle, a computer to function as: a rotation information calculation means for calculating wheel rotation information obtained from the respective wheel tires; a determination value computation means for computing a first determination value showing a difference between the sums of the wheel rotation information of pairs of wheel tires on two diagonal lines and a second determination value showing a difference between the sum of the wheel rotation information of right wheel tires and the sum of the wheel rotation information of left wheel tires; a conversion means for assuming the computed first and second determination values as points on orthogonal coordinates for which any one of the first determination value and the second determination value is an X axis and the other is a Y axis and converting the points to polar coordinates; a position determination means for determining position of tire(s) having a decreased pressure based on the argument of the points on the polar coordinates; and a decreased pressure determination means for comparing the moving radii of the points on the polar coordinates with a predetermined threshold value to thereby determine a decrease in tire air pressure.

(8) In the program of (7), it is preferred that the predetermined threshold value is different depending on the argument of the points and the threshold value is changed depending on the position of the tire having a decreased pressure. In this case, the threshold value changed depending on the position of the tire having a decreased pressure can reduce the dispersion of the decreased pressure level for issuing the decreased pressure alarm and also can reduce the risk of a false alarm. Specifically, regardless of the position of the tire having a decreased pressure, the decreased pressure alarm can be issued when the same level of the decreased pressure (e.g., 20%-decreased pressure) is reached.

(9) In the program of (7) or (8), it is preferred that the decreased pressure determination means determines a decrease in tire air pressure when the moving radius is larger than the predetermined threshold value for a predetermined time and the predetermined time is different depending on the position(s) of the tire(s) having a decreased pressure. In this case, by changing the determination time for issuing the decreased pressure alarm or not depending on the position(s) of the tire(s) having a decreased pressure, the risk of a false alarm can be reduced.

Advantageous Effect of Invention

According to the method, apparatus, and program of the present invention, even when not only one wheel tire but also two or more tires have a decreased pressure, the positions of the tires having a decreased pressure can be specified.

DESCRIPTION OF EMBODIMENTS

Figure 1:
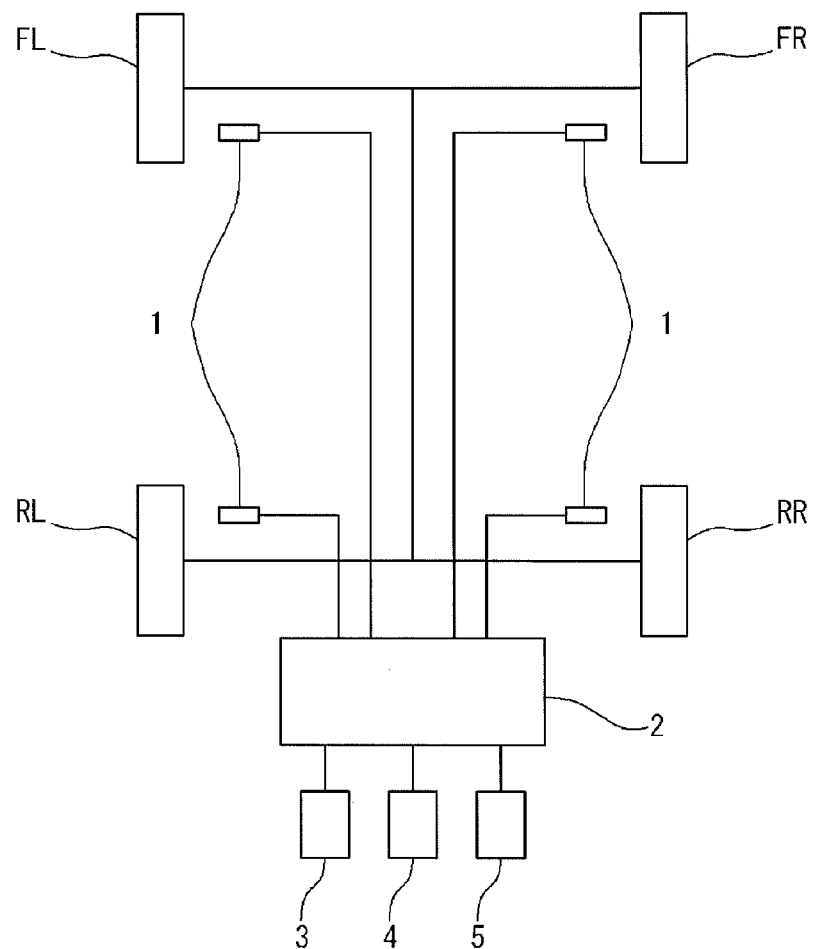
FIG. 1 is a block diagram illustrating one embodiment of a detection apparatus of the present invention.
Figure 2:
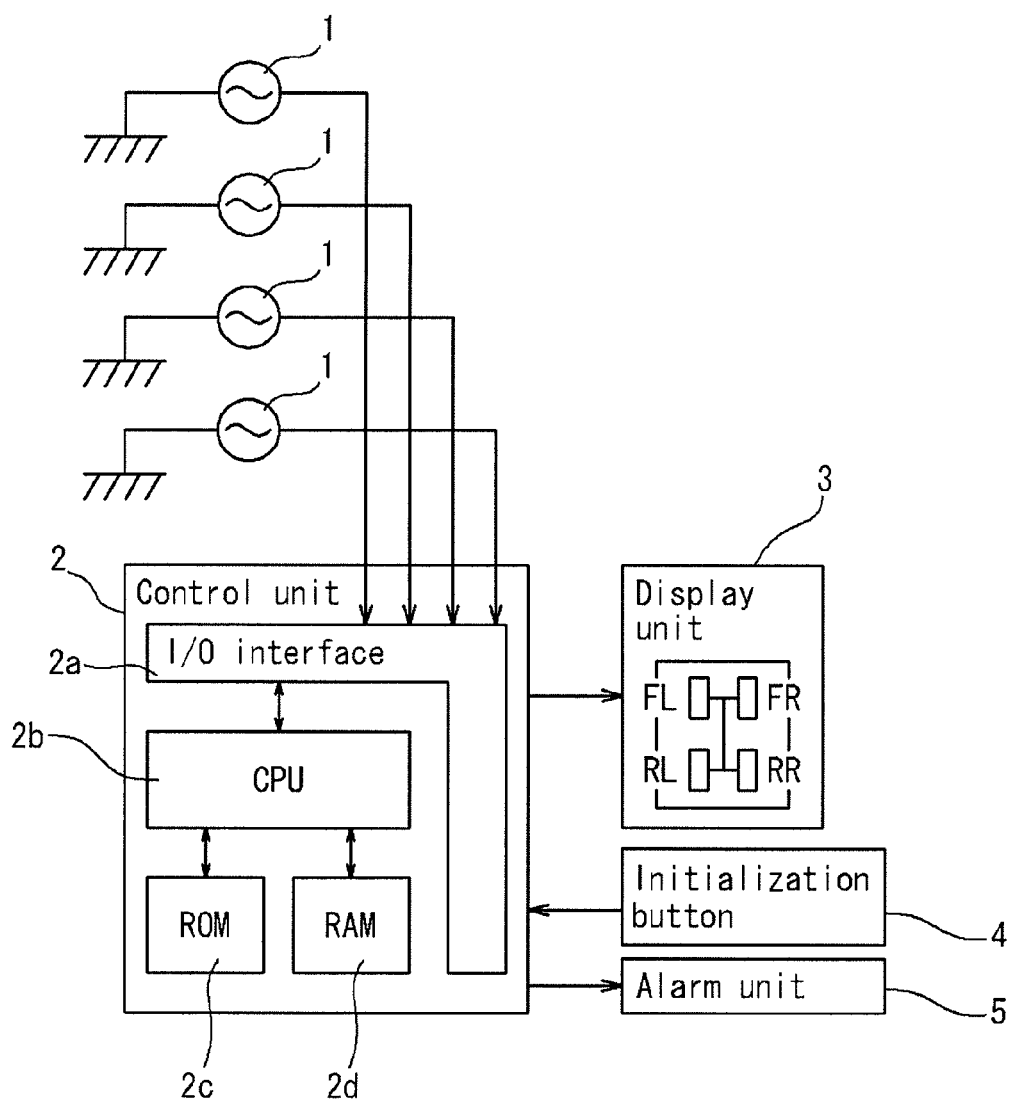
FIG. 2 is a block diagram illustrating an electric configuration of the detection apparatus shown in FIG. 1.

The following section will describe embodiments of a detection method, an apparatus and a program of the present invention in detail with reference to the attached drawings. FIG. 1 is a block diagram illustrating one embodiment of a detection apparatus of the present invention. FIG. 2 is a block diagram illustrating an electric configuration of the detection apparatus shown in FIG. 1.

As shown in FIG. 1, a detection apparatus according to an embodiment of the present invention includes a normal wheel speed detection means 1 in order to detect the rotation speeds of four tires provided in a four-wheel vehicle of a left front wheel (FL), a right front wheel (FR), a left rear wheel (RL), and a right rear wheel (RR). The normal wheel speed detection means 1 is provided to be associated with the respective tires.

The wheel speed detection means 1 may be, for example, a wheel speed sensor that uses an electromagnetic pickup for example to generate a rotation pulse to measure an angular velocity and a wheel speed based on the number of pulses or an angular velocity sensor such as a one that generates power using rotation as in a dynamo to measure an angular velocity and a wheel speed based on the voltage of the generated power. The output from the wheel speed detection means 1 is given to a control unit 2 that is a computer such as ABS. Connected to the control unit 2 are a display unit 3 comprising of a liquid crystal display element, a plasma display element or CRT for example for displaying a tire having a decreased internal pressure; an initialization button 4 that can be operated by a driver; and an alarm unit 5 for notifying a driver of a tire having a decreased internal pressure.

As shown in FIG. 2, the control unit 2 is composed of: an I/O interface 2a required for the exchange of a signal with an external apparatus; a CPU 2b functioning as a computation processing center; a ROM 2c storing therein a control operation program of the CPU 2b; and a RAM 2d into which data is temporarily written or from which the written data is read out when the CPU 2b performs a control operation.

The wheel speed detection means 1 outputs a pulse signal corresponding to the rotation number of a tire (hereinafter also referred to as "wheel speed pulse"). The CPU 2b calculates, based on the wheel speed pulse outputted from the wheel speed detection means 1, angular velocities Fi showing the rotation speed information of the respective tires at every predetermined sampling cycle $\Delta T$ (sec) (e.g., $\Delta T$=0.05 seconds).

The detection apparatus according to the present embodiment is composed of: the wheel speed detection means 1; a rotation information calculation means for calculating wheel rotation information using the wheel speed pulse from the wheel speed detection means 1; a determination value computation means for computing a first determination value showing a difference between the sums of the wheel rotation information of pairs of wheel tires on two diagonal lines and a second determination value showing a difference between the sum of the wheel rotation information of right wheel tires and the sum of the wheel rotation information of left wheel tires; a conversion means for assuming the computed first and second determination values as points on orthogonal coordinates for which any one of the first determination value and the second determination value is an X axis and the other is a Y axis and converting the points to polar coordinates; a position determination means for determining position of tire(s) having a decreased pressure based on the argument of the points on the polar coordinates; and a decreased pressure determination means for comparing the moving radii of the points on the polar coordinates with a predetermined threshold value to thereby determine a decrease in tire air pressure.

The program according to the present embodiment is installed in the control unit 2. The program causes the control unit 2 to function as the rotation information calculation means, the determination value computation means, the conversion means, the position determination means, and the decreased pressure determination means.

By the way, tires are manufactured to include a dispersion within standard (initial difference). Thus, the respective tires do not always have an identical effective rolling radius (a value obtained by dividing the distance travelled by one rotation by $2\pi$) even when all of the tires have a normal internal pressure, thus resulting in the respective tires having dispersed angular velocities Fi. To solve this, there is a method to exclude the influence by the initial difference from the angular velocities Fi for example. According to this method, the following initial correction coefficients K1, K2, and K3 are firstly calculated.

$$K1 = F1/F2 \tag{1}$$

$$K2 = F3/F4 \tag{2}$$

$$K3 = (F1 + K1 \times F2)/(F2 + K2 \times F4) \tag{3}$$

Next, the calculated initial correction coefficients K1, K2, and K3 are used to calculate a new angular velocity $F1_i$ as shown in the formulae (4) to (7).

$$F1_1 = F1 \tag{4}$$

$$F1_2 = K1 \times F2 \tag{5}$$

$$F1_3 = K3 \times F3 \quad (6)$$

$$F1_4 = K2 \times K3 \times F4 \quad (7)$$

In the formulae, the initial correction coefficient K1 is a coefficient to correct the difference in the effective rolling radius due to the initial difference between the front left and right tires. The initial correction coefficient K2 is a coefficient to correct the difference in the effective rolling radius due to the initial difference between the rear left and right tires. The initial correction coefficient K3 is a coefficient to correct the difference in the effective rolling radius due to the initial difference between the front-left tire and the rear-left tire. Based on the $F1_i$, the wheel speeds Vi of the tires of the respective wheels are calculated.

In the present embodiment, in order to determine a decrease in tire air pressure, the following two determination values DEL1 and DEL2 are used.

(1) The first determination value DEL1 is, as shown in the following formula (8), a value of a ratio obtained by deducting, with regard to pairs of wheel tires on two diagonal lines, an average of the wheel speeds of one pair of wheel tires from an average of the wheel speeds of the other pair of wheel tires and dividing the resulting difference by the average wheel speed of the four wheel tires.

$$DEL1 = \{(V1+V4)/2 - (V2+V3)/2\}/(V\text{mean}) \times 100(\%) \quad (8)$$

In the formula, V1 to V4 denote the wheel speeds of the left-front wheel tire, the right-front wheel tire, the left-rear wheel tire, and the right-rear wheel tire, respectively. Vmean is obtained by (V1+V2+V3+V4)/4.

(2) The second determination value DEL2 is, as shown in the following formula (9), a value of a ratio obtained by dividing the difference between the average wheel speed of the right wheel tires and the average wheel speed of the left wheel tires by the average wheel speed of the four wheels.

$$DEL2 = \{(V1+V3)/2 - (V2+V4)/2\}/(V\text{mean}) \times 100(\%) \quad (9)$$

In the present embodiment, the second determination value DEL2 is a determination value similar to the third determination value DEL3 in the above Patent Literature 2 or 3.

In the present invention, the first determination value DEL1 and the second determination value DEL2 calculated as described above are assumed as points on orthogonal coordinates for which any one of the first determination value and the second determination value is an X axis and the other is a Y axis. Then, these points are converted to polar coordinates. Specifically, when the first determination value DEL1 is the X axis for example, points given as (DEL1, DEL2) on the orthogonal coordinate system are converted to points on the polar coordinate system (r, θ). Then, a wheel having a decreased pressure is specified based on the value of the argument θ of the polar coordinates.

According to the finding by the present inventor in the running test of a 4-wheel vehicle in which the tire(s) are caused to have a decreased pressure under various situations (1 wheel having a decreased pressure, 2 wheels having a decreased pressure, 3 wheels having a decreased pressure, and 4 wheels having a decreased pressure), when the points representing the above-described first determination value DEL1 and second determination value DEL2 on the orthogonal coordinate system are converted to polar coordinates, wheel(s) having a decreased pressure can be specified based on the argument θ of the points.

Figure 3:
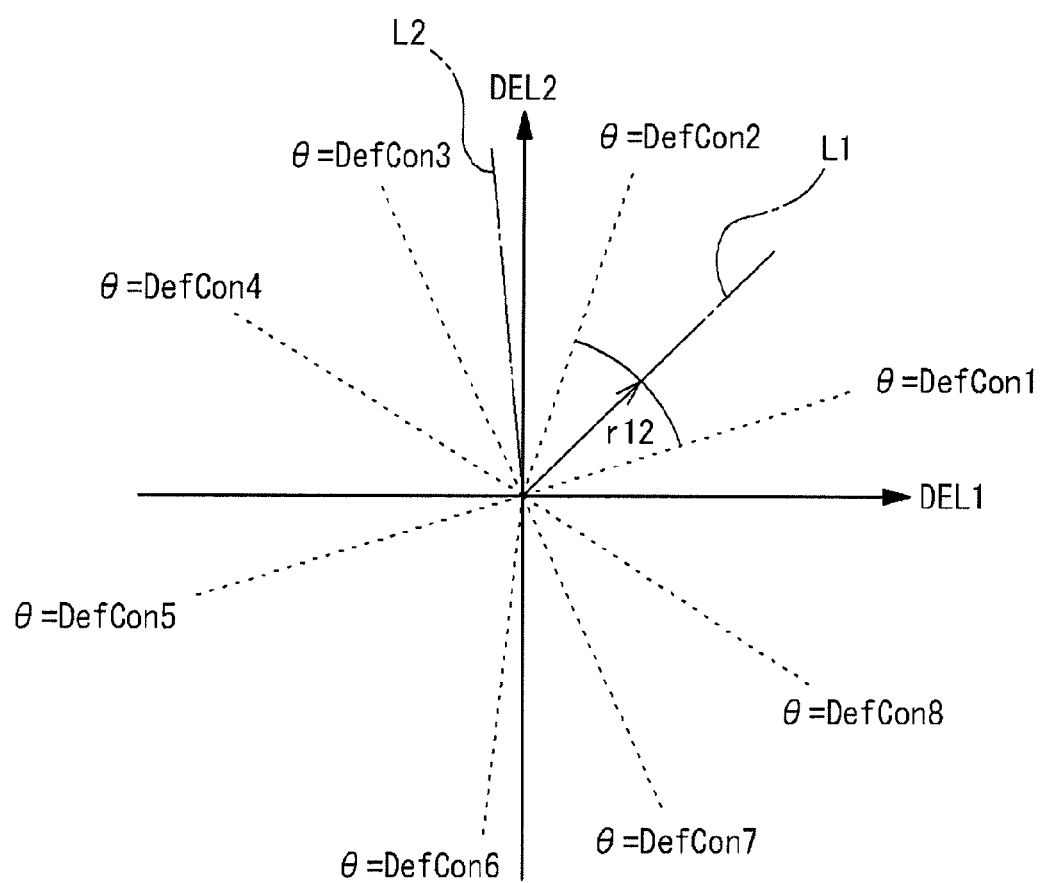
FIG. 3 illustrates the principle of the detection method of the present invention.

FIG. 3 illustrates the principle of the detection method of the present invention. In FIG. 3, the origin of the orthogonal coordinate system is at the same position as the pole of the polar coordinate system. The horizontal axis in the orthogonal coordinate system shows the first determination value DEL1 and the vertical axis shows the second determination value DEL2. In FIG. 3, the eight half lines shown by the broken lines denote the border lines DefCon1 to DefCon8. These eight border lines divide the polar coordinate system to eight regions. Based on the regions within which (DEL1, DEL2) exist (in other words, based on the argument θ of the points (r, θ) obtained by converting the points in the orthogonal coordinate system (DEL1, DEL2) to the polar coordinate system), wheel(s) having a decreased pressure can be specified.

Specifically, the following tires having a decreased pressure can be located.

1) If DefCon1<θ≤DefCon2 is established, the left-front wheel has a decreased pressure or the left-front wheel, left-rear wheel, and right-rear wheel have a decreased pressure.
2) If DefCon2<θ≤DefCon3 is established, the left-front wheel and the left-rear wheel have a decreased pressure.
3) If DefCon3<θ≤DefCon4 is established, the left-rear wheel has a decreased pressure or the left-front wheel, right-front wheel, and left-rear wheel have a decreased pressure.
4) If DefCon4<θ≤DefCon5 is established, the right-front wheel and the left-rear wheel have a decreased pressure.
5) If DefCon5<θ≤DefCon6 is established, the right-front wheel has a decreased pressure or the right-front wheel, left-rear wheel, and right-rear wheel have a decreased pressure.
6) If DefCon6<θ≤DefCon7 is established, the right-front wheel and the right-rear wheel have a decreased pressure.
7) If DefCon7<θ≤DefCon8 is established, the right-rear wheel has a decreased pressure or the left-front wheel, right-front wheel, and right-rear wheel have a decreased pressure.
8) If θ is other than the above (θ is within a region between DefCon8 and DefCon1 in the counterclockwise direction), the left-front wheel and right-rear wheel have a decreased pressure.

If the point is at the origin (when DEL1 and DEL2 are both zero or very small and thus can be evaluated as being substantially zero), it can be determined that four wheels have a decreased pressure, the left-front wheel and right-front wheel have a decreased pressure (two front wheels have a decreased pressure), the left-rear wheel and right-rear wheel have a decreased pressure (two rear wheels have a decreased pressure), or no wheel has a decreased pressure.

Specifically, in the present invention, based on the value of the argument θ, there can be specified one wheel having a decreased pressure or three wheels having a decreased pressure or two wheels having a decreased pressure (two diagonal wheels having a decreased pressure or two wheels at one side having a decreased pressure). With regard to two wheels having a decreased pressure, two front wheels having a decreased pressure and two rear wheels having a decreased pressure cannot be specified.

The eight border lines (θ=DefCon1 to DefCon8) can be set in the manner as described below for example.

With regard to the eight decreased pressure patterns of one wheel having a decreased pressure (the left-front wheel having a decreased pressure, the left-rear wheel having a decreased pressure, the right-front wheel having a decreased pressure, and the right-rear wheel having a decreased pressure), two diagonal wheels having a decreased pressure (the right-front wheel and left-rear wheel having a decreased pressure, and the left-front wheel and right-rear wheel having a decreased pressure), and two wheels at one side having a decreased pressure (the left-front wheel and left-rear wheel having a decreased pressure and the right-front wheel and right-rear wheel having a decreased pressure), DEL1 and DEL2 are calculated while changing the running conditions such as the tires to be attached to the vehicle, the vehicle speed, and the load. The decreased pressure level is a decreased pressure level at which an alarm is issued. The decreased pressure level is a 20%-decreased pressure for example when an alarm is desired to be issued if a tire has a decreased pressure 20%-lower than a normal pressure.

A plurality of values of DEL1 and DEL2 calculated with regard to the respective decreased pressure patterns are plotted to orthogonal coordinates. Then, the plurality of points are subjected to the least-square method for example to calculate the regression line passing the origin. As a result, eight half lines passing the origin can be obtained. Next, a half line passing the middle of two neighboring half lines is set. This set half line can be used as the border line.

In FIG. 3, the half line shown by L1 is a regression line obtained from DEL1 and DEL2 when the left-front wheel has a decreased pressure. The half line shown by L2 is a regression line obtained from DEL1 and DEL2 when the left-front wheel and left-rear wheel have a decreased pressure. Then, DefCon2 can be set at the middle between L1 and L2.

When assuming that DEL1 is the X axis and DEL2 is the Y axis, the collection of the points obtained by plotting DEL1 and DEL2 in the eight decreased pressure patterns can be divided for the respective decreased pressure patterns. These points appear in a fixed order starting from θ=0 in the polar coordinate system in the counterclockwise direction for example. For example, the collection of points of (DEL1, DEL2) corresponding to a left-front wheel and a left-rear wheel having a decreased pressure is adjacent in the counterclockwise direction to the collection of points of (DEL1, DEL2) corresponding to a left-front wheel having a decreased pressure, and the collection of points of (DEL1, DEL2) corresponding to a left-rear wheel having a decreased pressure is adjacent in the counterclockwise direction to the collection of points of (DEL1, DEL2) corresponding to a left-front wheel and a left-rear wheel having a decreased pressure.

Whether an alarm is issued or not is determined based on the distance from the pole (i.e., the size of the moving radius r). Specifically, the decreased pressure position is specified based on the argument θ of the points on the polar coordinate system (r, θ) obtained based on DEL1 and DEL2 calculated during running. Then, whether a decreased pressure exceeding the predetermined amount occurs or not (whether an alarm is issued or not) is determined based on the comparison between the moving radius r and the predetermined threshold value Tr.

In this case, the threshold value is preferably changed depending on the position of a tire having a decreased pressure. Specifically, different threshold values are preferably set to the respective eight decreased pressure patterns. By changing the threshold value depending on the position of a tire having a decreased pressure, the dispersion of the decreased pressure levels for issuing the decreased pressure alarm can be reduced and the risk of a false alarm can be reduced. Specifically, regardless of the position of a tire having a decreased pressure, the decreased pressure alarm can be issued at the same level of the decreased pressure (e.g., a 20%-decreased pressure).

In the example shown in FIG. 3, the alarm threshold value for DefCon1<θ≤DefCon2 is set to r12. Further, the alarm threshold value for DefCon2<θ≤DefCon3 can be set to r23, and the alarm threshold value for DefCon3<θ≤DefCon4 can be set to r34. In the similar manner, r45, r56, r67, r78, and r81 can be set. The values of r12 to r81 as described above can be appropriately determined, when an alarm is desired to be issued if a 20%-decreased pressure is found, by calculating the average value of the moving radii r and the standard deviation when the respective decreased pressure patterns have a 20%-decreased pressure and setting the formula of the alarm threshold value=the average value−the standard deviation or the formula of the alarm threshold value=the average value−the standard deviation×3 for example.

Example

Next, the following section will describe the detection method of the present invention based on Example. However, the present invention is not limited to such Example only.

Figure 4:
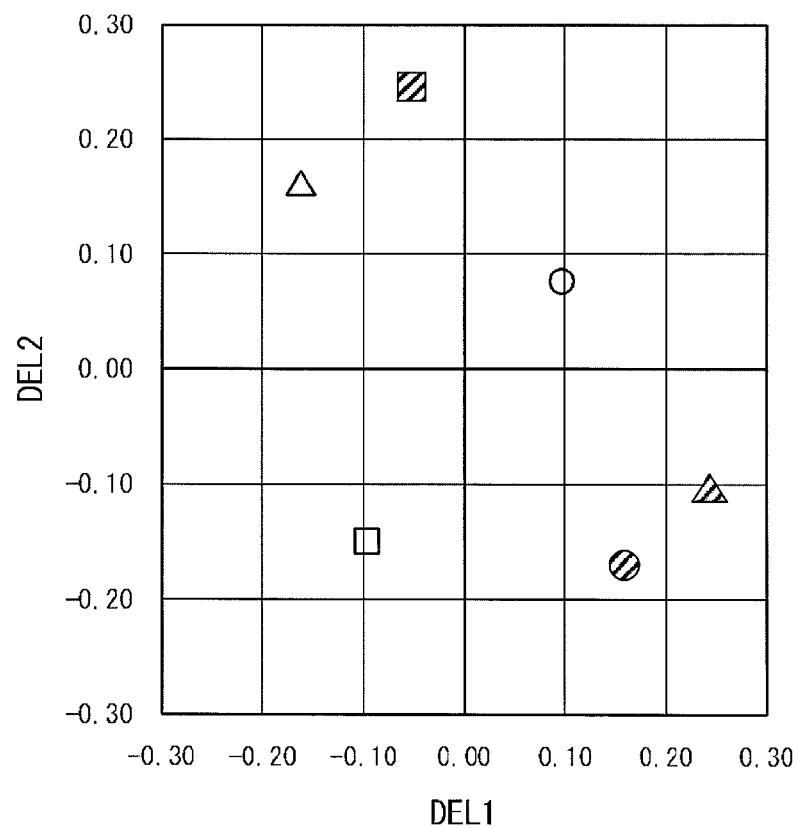
FIG. 4 illustrates the plotting of DEL1 and DEL2 in Example.

A front-wheel-drive vehicle of an engine size of 1400 cc was attached with tires (195/45R16) and was allowed to run on a general road in Germany for about 30 minutes. With regard to the respective six decreased pressure patterns (a left-front wheel having a decreased pressure, a right-front wheel having a decreased pressure, a left-rear wheel having a decreased pressure, a right-rear wheel having a decreased pressure, a left-front wheel and a left-rear wheel having a decreased pressure, as well as a left-front wheel and a right-rear wheel having a decreased pressure, the decreased pressure level is lower by 20% than a specified pressure), DEL 1 shown by the formula (8) and DEL 2 shown by the formula (9) are calculated every one minute. Then, the average values of DEL1 and DEL 2 are plotted to orthogonal coordinates as shown in FIG. 4.

Figure 5:
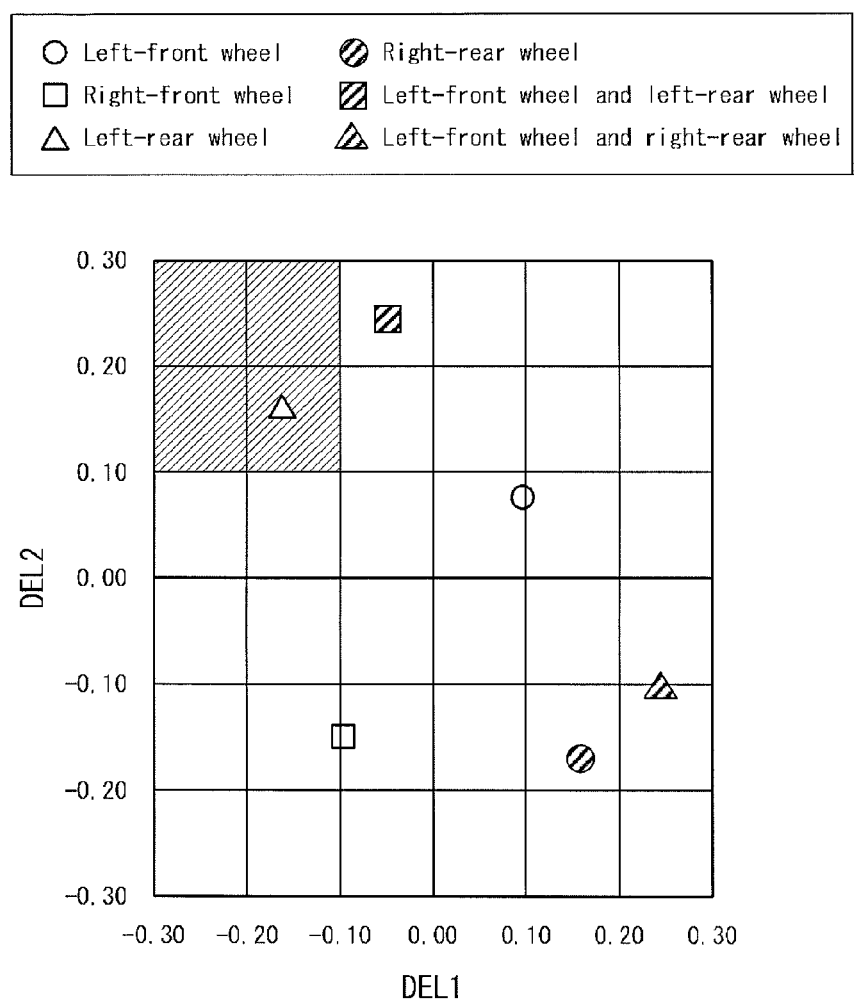
FIG. 5 illustrates the plotting of DEL1 and DEL2 in Example.
Figure 6:
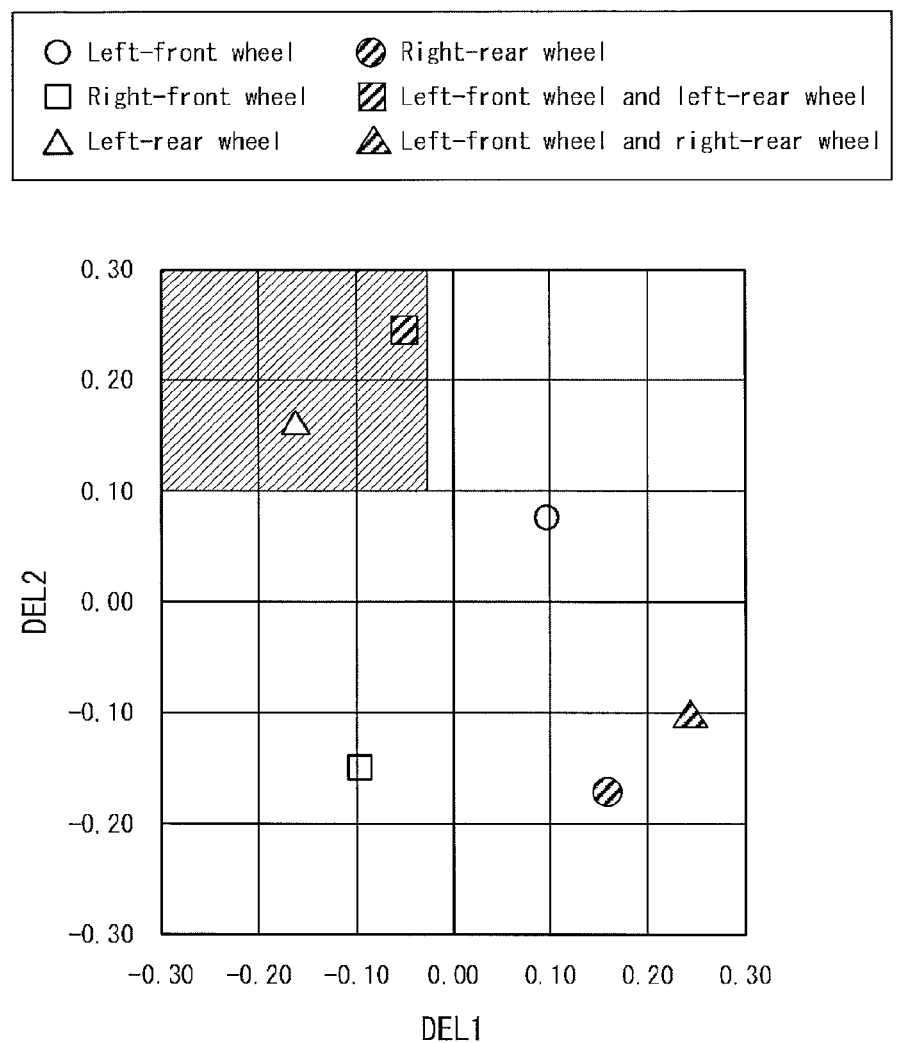
FIG. 6 illustrates the plotting of DEL1 and DEL2 in Example.

When a decreased pressure wheel is specified based on the signs of DEL1 and DEL2 as in the prior art, a left-rear wheel having a decreased pressure cannot be differentiated from a left-front wheel and a left-rear wheel having a wheel decreased pressure for example. In the case of the method disclosed in Patent Literature 3, DEL1<−0.10 and DEL2>0.10 for example are set so that an alarm is issued when a left-rear wheel has a decreased pressure (the hatched region in FIG. 5 shows a region within which an alarm is issued). If this method is used to also issue an alarm when a left-front wheel and a left-rear wheel have a decreased pressure, however, DEL<−0.03 and DEL2>0.10 must be set as shown in FIG. 6. In this case, however, one wheel having a decreased pressure cannot be differentiated from two wheels having a decreased pressure. Similarly, the hatched region in FIG. 6 shows a region within which an alarm is issued.

Figure 7:
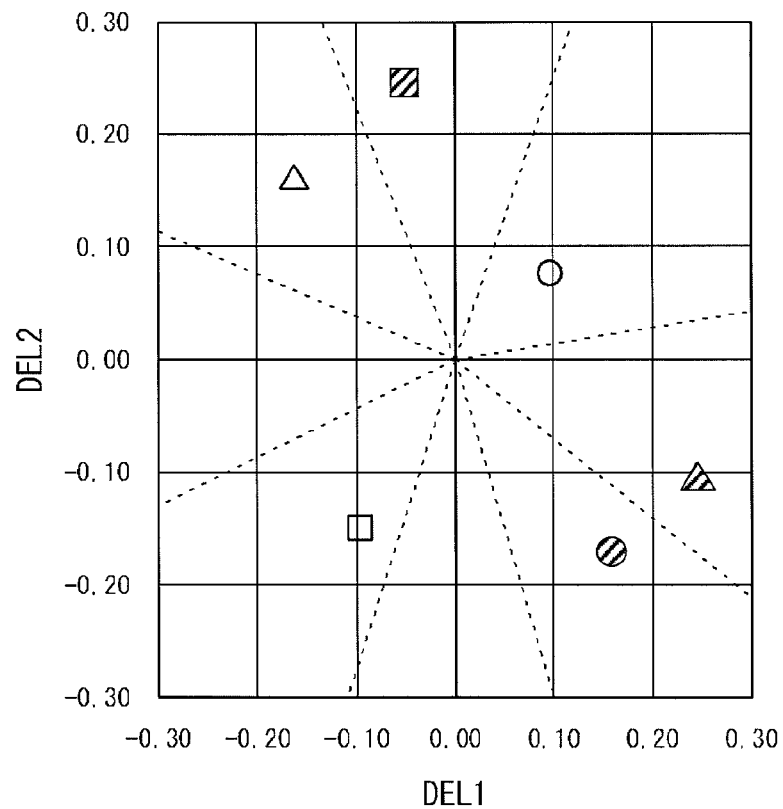
FIG. 7 illustrates the border line for specifying a decreased pressure position.

On the other hand, FIG. 7 illustrates the border lines DefCon1 to DefCon8 shown by the broken line calculated by performing a preliminary experimental running (an experimental running carried out prior to the 30-minute experimental running) with regard to the above-described eight decreased pressure patterns. In the present Example, DefCon1 was set to 5 degrees, DefCon2 was set to 70 degrees, DefCon3 was set to 120 degrees, DefCon4 was set to 150 degrees, DefCon5 was set to 200 degrees, DefCon6 was set to 265 degrees, DefCon7 was set to 300 degrees, and DefCon8 was set to 320 degrees.

As shown in FIG. 7, by specifying the position of a wheel having a decreased pressure based on the argument θ at the points (r, θ) obtained by converting the points on the orthogonal coordinate system (DEL1, DEL2) to the polar coordinate system, the status that could not be identified by the conventional technique (one wheel having a decreased pressure or two wheels having a decreased pressure) can be identified. Strictly speaking, the present invention can specifically provide the specifying of one wheel having a decreased pressure or three wheels having a decreased pressure and two wheels having a decreased pressure (except for two front wheels having a decreased pressure and two rear wheels having a decreased pressure). However, three wheels having a decreased pressure or four wheels having a decreased pressure rarely occur. Thus, wheel(s) having a decreased pressure can be practically specified in substantially all cases.

Figure 8:
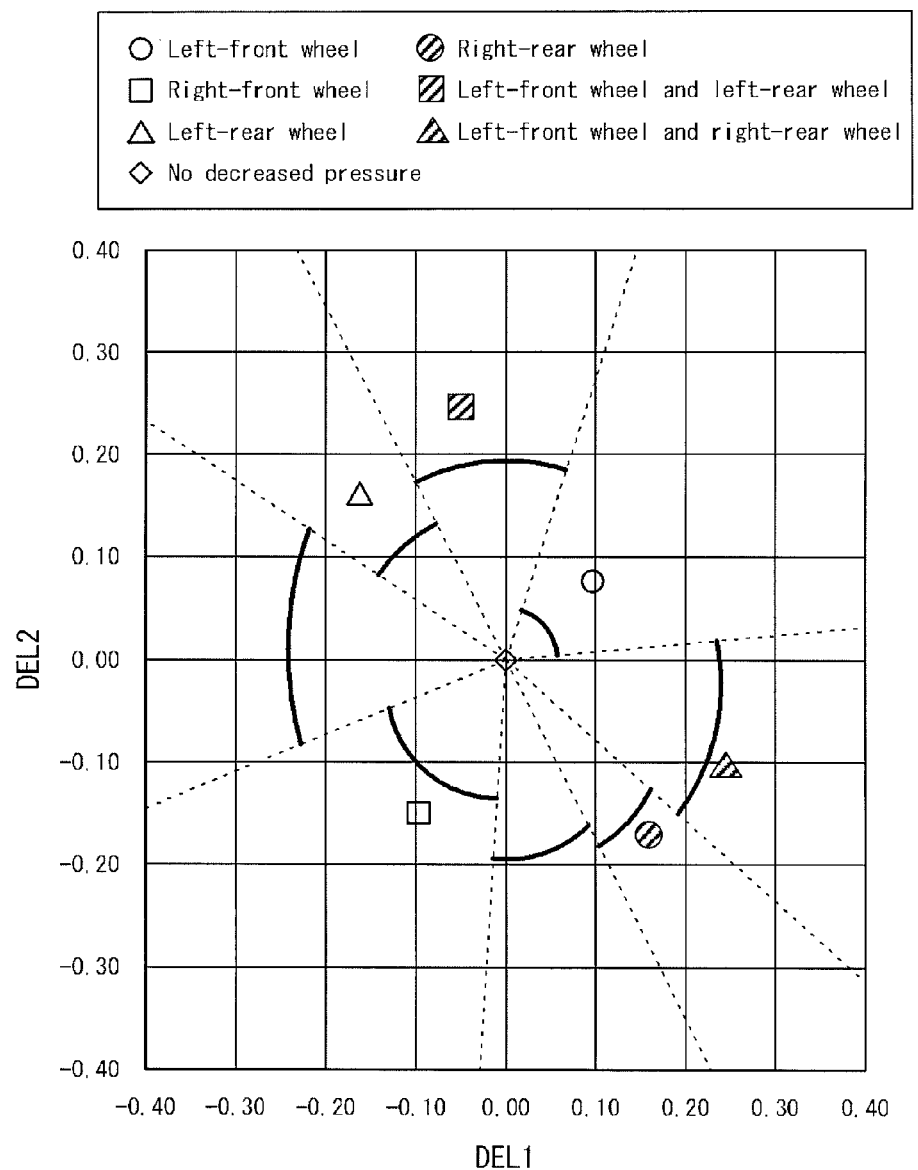
FIG. 8 illustrates the threshold value depending on the decreased pressure position.

FIG. 8 shows an example in which a different threshold value is set depending on the status of a decreased pressure. In this example, the threshold value is defined based on the distance from the origin (i.e., the moving radius r in the polar coordinate system). A different threshold value set depending on the status of a decreased pressure can reduce the dispersion of the decreased pressure levels for issuing the decreased pressure alarm and can reduce the risk of a false alarm. Specifically, regardless of the position(s) of tire(s) having a decreased pressure, the decreased pressure alarm can be issued when the same level of the decreased pressure (e.g., a 20%-decreased pressure) is reached.

It is preferred that, when the moving radius r is larger than the predetermined threshold value Tr for a predetermined time, a decrease in tire air pressure is determined and the predetermined time is different depending on the position(s) of the tire(s) having a decreased pressure. In this case, the risk of a false alarm can be reduced by changing the determination time for determining the decreased pressure alarm or not depending on the position(s) of tire(s) having a decreased pressure. For example, when two diagonal wheels have a decreased pressure, an alarm can be issued when the alarm threshold value is exceeded for 20 seconds. When one wheel has a decreased pressure, an alarm can be issued when the alarm threshold value is exceeded for 10 seconds. In the case of this example, it is expected that one wheel having a decreased pressure occurs more frequently than two diagonal wheels having a decreased pressure. A trade-off relation is established between the risk of a false alarm and the risk of failing to issue an alarm. These risks can be dispersed to thereby reduce the total risk.

Other Modification Example

The present invention is not limited to the above-described embodiment and can be subjected to various changes within the scope of the claims. For example, the first determination value DEL 1 showing a difference between the sums of the wheel rotation information of pairs of wheel tires on two diagonal lines and the second determination value DEL2 showing a difference between the sum of the wheel rotation information of right wheel tires and the sum of the wheel rotation information of left wheel tires are not respectively limited to those represented by the formula (8) and the formula (9). Any formula can be appropriately used so long as the formula can represent or reflect a difference in the wheel rotation information (e.g., wheel speed) between diagonal wheels or a difference in the wheel rotation information between left and right wheels, including the following formula (8)' and formula (9)' for example.

$$DEL1 = \{(V1+V4)/(V2+V3)-1\} \times 100(\%) \quad (8)'$$

$$DEL2 = \{(V1+V3)/(V2+V4)-1\} \times 100(\%) \quad (9)'$$

With regard to how to calculate the border lines DefCon1 to DefCon8, in addition to the use of a half line passing the middle of neighboring regression lines as described above, a discriminant function by a discriminant analysis for example also can be used.

REFERENCE SIGNS LIST

1 Wheel speed detection means
2 Control unit
2*a* Interface
2*b* CPU
2*c* ROM
2*d* RAM
3 Display unit
4 Initialization button
5 Alarm unit

What is claimed is:

1. A method of detecting a decrease in tire air pressure for detecting a decrease in tire air pressure based on wheel rotation information obtained from tires attached to a 4-wheel vehicle, including:
  a step of calculating tire rotation information obtained from the respective wheel tires;
  a step of computing a first determination value showing a difference between the sums of the wheel rotation information of pairs of wheel tires on two diagonal lines and a second determination value showing a difference between the sum of the wheel rotation information of right wheel tires and the sum of the wheel rotation information of left wheel tires;
  a step of assuming the computed first and second determination values as points on orthogonal coordinates for which any one of the first determination value and the second determination value is an X axis and the other is a Y axis and converting the points to polar coordinates;
  a step of determining position of tire(s) having a decreased pressure based on the argument of the points on the polar coordinates; and
  a step of comparing the moving radii of the points on the polar coordinates with a predetermined threshold value to thereby determine a decrease in tire air pressure.

2. The method of detecting a decrease in tire air pressure according to claim 1, wherein the predetermined threshold value is different depending on the argument of the point and the threshold value is changed depending on the position of the tire having a decreased pressure.

3. The method of detecting a decrease in tire air pressure according to claim 1, wherein when the moving radius is larger than the predetermined threshold value for a predetermined time, a decrease in tire air pressure is determined and the predetermined time is different depending on the position (s) of the tire(s) having a decreased pressure.

4. The method of detecting a decrease in tire air pressure according to claim 2, wherein when the moving radius is larger than the predetermined threshold value for a predetermined time, a decrease in tire air pressure is determined and the predetermined time is different depending on the position (s) of the tire(s) having a decreased pressure.

5. An apparatus for detecting a decrease in tire air pressure for detecting a decrease in tire air pressure based on wheel rotation information obtained from tires attached to a 4-wheel vehicle, comprising:
  a rotation information calculation means for calculating wheel rotation information obtained from the respective wheel tires;
  a determination value computation means for computing a first determination value showing a difference between the sums of the wheel rotation information of pairs of wheel tires on two diagonal lines and a second determination value showing a difference between the sum of the wheel rotation information of right wheel tires and the sum of the wheel rotation information of left wheel tires;
  a conversion means for assuming the computed first and second determination values as points on orthogonal coordinates for which any one of the first determination value and the second determination value is an X axis and the other is a Y axis and converting the points to polar coordinates;

a position determination means for determining position of tire(s) having a decreased pressure based on the argument of the points on the polar coordinates; and a decreased pressure determination means for comparing the moving radii of the points on the polar coordinates with a predetermined threshold value to thereby determine a decrease in tire air pressure.

6. The apparatus for detecting a decrease in tire air pressure according to claim 5, wherein the predetermined threshold value is different depending on the argument of the points and the threshold value is changed depending on the position of the tire having a decreased pressure.

7. The apparatus for detecting a decrease in tire air pressure according to claim 5, wherein the decreased pressure determination means determines a decrease in tire air pressure when the moving radius is larger than the predetermined threshold value for a predetermined time and the predetermined time is different depending on the position(s) of the tire(s) having a decreased pressure.

8. The apparatus for detecting a decrease in tire air pressure according to claim 6, wherein the decreased pressure determination means determines a decrease in tire air pressure when the moving radius is larger than the predetermined threshold value for a predetermined time and the predetermined time is different depending on the position(s) of the tire(s) having a decreased pressure.

9. A computer program product embodied on a non-transitory computer readable medium for detecting a decrease in tire air pressure based on wheel rotation information obtained from tires attached to a 4-wheel vehicle, the computer program product comprising:

rotation information calculation computer-executable instructions for calculating wheel rotation information obtained from the respective wheel tires;

determination value computation computer-executable instructions for computing a first determination value showing a difference between the sums of the wheel rotation information of pairs of wheel tires on two diagonal lines and a second determination value showing a difference between the sum of the wheel rotation information of right wheel tires and the sum of the wheel rotation information of left wheel tires;

conversion computer-executable instructions for assuming the computed first and second determination values as points on orthogonal coordinates for which any one of the first determination value and the second determination value is an X axis and the other is a Y axis and converting the points to polar coordinates;

position determination computer-executable instructions for determining position of tire(s) having a decreased pressure based on the argument of the points on the polar coordinates; and decreased pressure determination computer-executable instructions for comparing the moving radii of the points on the polar coordinates with a predetermined threshold value to thereby determine a decrease in tire air pressure.

10. The computer program product for detecting a decrease in tire air pressure according to claim 9, wherein the predetermined threshold value is different depending on the argument of the points and the threshold value is changed depending on the position of the tire having a decreased pressure.

11. The computer program product for detecting a decrease in tire air pressure according to claim 9, wherein the decreased pressure determination computer-executable instructions are for determining a decrease in tire air pressure when the moving radius is larger than the predetermined threshold value for a predetermined time and the predetermined time is different depending on the position(s) of the tire(s) having a decreased pressure.

12. The computer program product for detecting a decrease in tire air pressure according to claim 10, wherein the decreased pressure determination computer-executable instructions are for determining a decrease in tire air pressure when the moving radius is larger than the predetermined threshold value for a predetermined time and the predetermined time is different depending on the position(s) of the tire(s) having a decreased pressure.

* * * * *